(12) United States Patent
Kim et al.

(10) Patent No.: US 9,691,520 B2
(45) Date of Patent: Jun. 27, 2017

(54) METHOD FOR PREPARING POLYMER-NANOPARTICLES HAVING CORE-SHELL STRUCTURE BY UNIFORMLY COATING POLYMER ON METAL AND INORGANIC PARTICLES, POLYMER-NANOPARTICLES PREPARED THEREBY, AND POLYMER-NANOPARTICLE COMPOSITE COMPRISING SAME

(71) Applicant: KOREA RESEARCH INSTITUTE OF CHEMICAL TECHNOLOGY, Daejeon (KR)

(72) Inventors: Byoung Gak Kim, Daejeon (KR); Jong Chan Won, Daejeon (KR); Yong Seok Kim, Daejeon (KR); No Kyun Park, Daejeon (KR); Jin Young Park, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 73 days.

(21) Appl. No.: 14/389,978

(22) PCT Filed: Apr. 3, 2013

(86) PCT No.: PCT/KR2013/002753
§ 371 (c)(1),
(2) Date: Oct. 1, 2014

(87) PCT Pub. No.: WO2013/151319
PCT Pub. Date: Oct. 10, 2013

(65) Prior Publication Data
US 2015/0073101 A1      Mar. 12, 2015

(30) Foreign Application Priority Data

Apr. 3, 2012   (KR) .......... 10-2012-0034422
Apr. 3, 2012   (KR) .......... 10-2012-0034664

(51) Int. Cl.
| | |
|---|---|
| H01B 19/04 | (2006.01) |
| H01B 3/30 | (2006.01) |
| B01J 13/02 | (2006.01) |
| H01B 3/42 | (2006.01) |

(52) U.S. Cl.
CPC .............. *H01B 3/306* (2013.01); *B01J 13/02* (2013.01); *H01B 3/427* (2013.01); *H01B 19/04* (2013.01)

(58) Field of Classification Search
CPC .. A61K 9/1075; A61K 49/048; A61K 49/225; A61K 51/1251; A61K 9/5089; B82Y 30/00; B82Y 10/00; B82Y 40/00; B82Y 5/00; B82Y 20/00; B82Y 15/00; C08L 2207/53; Y10T 428/2982; Y10T 428/30; B01J 13/02; H01B 19/04; H01B 3/306; H01B 3/427
USPC ........ 428/402–402.24, 403, 404, 407, 321.1, 428/474.4; 427/331, 389.9, 212, 427/213–213.36, 483, 25; 264/534, 5, 41, 264/4–4.7; 424/725, 10.1, 76.2, 400, 408, 424/450, 451, 455, 93.7, 184.1, 497, 489, 424/501, 490, 491, 492, 493, 494, 495
See application file for complete search history.

(56) References Cited

U.S. PATENT DOCUMENTS

| | | |
|---|---|---|
| 4,256,785 A | 3/1981 | Dannelly |
| 2008/0209876 A1* | 9/2008 | Miller ................ G11C 13/0009 55/522 |

FOREIGN PATENT DOCUMENTS

| | | |
|---|---|---|
| EP | 0666577 A1 | 8/1995 |
| KR | 1020100034187 A | 4/2010 |
| KR | 100963648 B1 | 6/2010 |
| KR | 1020100124624 A | 11/2010 |
| WO | 2004/091571 A2 | 10/2004 |
| WO | 2011/072045 A2 | 6/2011 |

OTHER PUBLICATIONS

Richard Knapp, Doctoral Dissertation, Technische Universitat Munchen, Jun. 2010.*
Dash et al., J. Mol. Catal. A: Chemical, 286 (2008) 114-119.*
International Search Report dated Jun. 25, 2013; PCT/KR2013/002753.

* cited by examiner

*Primary Examiner* — Irina S Zemel
(74) *Attorney, Agent, or Firm* — Ladas & Parry LLP; Loren K. Thompson

(57) ABSTRACT

The present invention relates to a method for preparing polymer-nanoparticles having a core-shell structure by uniformly coating a polymer on metal and inorganic particles, polymer-nanoparticles prepared thereby, and a polymer-nanoparticle composite comprising the same, and more specifically, a method for preparing polymer-nanoparticles having a core-shell structure by uniformly coating a polymer on metal and inorganic particles, polymer-nanoparticles prepared thereby, and a polymer-nanoparticle composite including the same, wherein when forming a polymer coating layer on surfaces of particles that are not subjected to separate surface treatment, excessive polymers uncoated on nanoparticles are easily removed by adding to an ionic liquid or an apolar solvent so that the polymer coating layer is formed with a nanometer-scale uniform thickness and a dense coating density, thereby showing excellent dispersibility in a polymer matrix.

5 Claims, 6 Drawing Sheets

METHOD FOR PREPARING POLYMER-NANOPARTICLES HAVING CORE-SHELL STRUCTURE BY UNIFORMLY COATING POLYMER ON METAL AND INORGANIC PARTICLES, POLYMER-NANOPARTICLES PREPARED THEREBY, AND POLYMER-NANOPARTICLE COMPOSITE COMPRISING SAME

TECHNICAL FIELD

The present invention relates to a method for preparing polymer-nanoparticles having a core-shell structure by uniformly coating a polymer on metal and inorganic particles, polymer-nanoparticles prepared thereby, and a polymer-nanoparticle composite comprising the same, and more particularly, to a method for preparing polymer-nanoparticles having a core-shell structure by uniformly coating a polymer on metal and inorganic particles, polymer-nanoparticles prepared thereby, and a polymer-nanoparticle composite comprising the same, wherein when forming a polymer coating layer on surfaces of particles that are not subjected to separate surface treatment, excessive polymers uncoated on nanoparticles are easily removed by adding to an ionic liquid or an apolar solvent so that a polymer coating layer is formed with a nanometer scale uniform thickness and a dense coating density, thereby showing excellent dispersibility in a polymer matrix.

BACKGROUND ART

The development of a high dielectric material to be used in an embedded type passive device such as an inductor, a resistive material, or the like, as well as a large-area capacitor has been required. In general, as a method for forming a high dielectric insulation film, there is a method for forming a composite of ceramic or metal particles and a polymer material to use the formed composite as a high dielectric material. However, due to a difference in chemical and physical properties between the polymer and the ceramic or metal particles, it is difficult to effectively disperse the ceramic or metal particles, such that it is difficult to improve physical properties through composite formation.

Therefore, composite formation of inorganic or metal nanoparticles with a polymer matrix may be performed by organic surface treatment, which is performed for various purposes in various forms. In the case of treating the inorganic or metal nanoparticles with an apolar organic layer, dispersibility of particles in an apolar medium is increased, such that the inorganic or metal nanoparticles may be treated with a homogeneous dispersion solution. Particularly, in the case in which the dispersion medium is a polymer, a polymer-inorganic particle or polymer-metal particle nanocomposite is formed due to this function, such that physical properties of the polymer are improved, thereby making it possible to be applied to various materials for a high dielectric thin film, a high strength construction material, a high barrier film, various function films, or the like.

As an organic surface treatment method of the inorganic or metal nanoparticles as described above, an attaching method to a surface by chemical bonds using functional groups of monomolecular materials, an attaching method by physical adsorption caused by an electrostatic interaction, or the like, using functional groups of monomolecular materials, a coating method by coagulation of polymer materials formed on surfaces of particles, a coating method by chemical bonds between functional groups of a polymer chain and surfaces of particles or physical adsorption caused by an electrostatic interaction therebetween, and the like, have been widely used, but in the case of separately performing surface treatment on the inorganic or metal nanoparticles, there are problems in that a process becomes significantly complicated, and a cost and time are increased.

Further, since a polymer composite film having excellent performance may be formed through hybrid particles coated with polyimide and composite formation of the hybrid particles in a polymer matrix due to inherent excellent heat resistance, chemical resistance, and mechanical properties of polyimide, a method using polyimide has been spotlighted among methods for treating surfaces of inorganic or metal nanoparticles with a polymer material. However, in the case of forming a polyimide layer enclosing inorganic particles by simple coagulation of polymer chains, there is a problem in that a stable and uniform interface of polymer-inorganic or metal particles may not be sufficiently formed. Polyimide is formed by preparing polyamic acid as a precursor and imidizing polyamic acid due to characteristics of a manufacturing process. Since in a polyamic acid state, a carboxyl group is present in each repeating unit of a polymer chain, it is considered that an electrostatic interaction with inorganic or metal nanoparticles is large and a stable polymer coating layer is formed, but when the imidization of polyamic acid into polyimide is completed, the carboxyl group is not present in the polymer chain, such that the interaction with the inorganic particles becomes weakened, and it is difficult to completely coating the surfaces of the inorganic particles.

A high dielectric thin film prepared by a composite of inorganic nanoparticles coated with a block copolymer and a polymer matrix has been disclosed in Korean Patent No. 10-0963648 (Patent Document 1), and a polyimide-inorganic particle composite obtained by preparing polyamic acid including a poloar functional group, preparing polyimide-inorganic particles using the polyamic acid, and coating the polyimide-inorganic particles on a polymer matrix has been disclosed in Korean Patent Laid-Open Publication No. 10-2010-0124624 (Patent Document 2).

At the time of preparing the inorganic or metal nanoparticle-polymer composite according to the related art as described above, surface treatment such as organic surface treatment, or the like, of the nanoparticles, or an additional process such as introduction of a functional group in a polymer for coating the particles, or the like, has been required, such that a process cost and process time are increased.

RELATED ART DOCUMENT (Patent Document 1) Korean Patent No. 10-0963648
(Patent Document 2) Korean Patent Laid-Open Publication No. 10-2010-0124624

DISCLOSURE

Technical Problem

An object of the present invention is to provide a method for preparing polymer-nanoparticles having a core-shell structure in which the polymer coating layer is formed with a nanometer-scale uniform thickness and a dense coating density by forming a polymer coating layer on surfaces of nanoparticles that are not subjected to separate surface treatment and facilitating removal of polymers uncoated on surfaces of nanoparticles by a density separation method using an ionic liquid or an apolar solvent.

Another object of the present invention is to provide polymer-nanoparticles having a core-shell structure prepared by the method for preparing polymer-nanoparticles as described above.

Another object of the present invention is to provide a polymer-nanoparticle composite in which the polymer-nanoparticles having a core-shell structure as described above are suitably dispersed in a polymer matrix.

Technical Solution

In order to achieve the above-mentioned objects, in a method according to the present invention, when an in-situ reaction of a suspension containing a polymer solution and nanoparticles is performed, a polymer is adsorbed in inorganic or metal nanoparticles to form a coating layer, and in order to separate an uncoated polymer, the suspension is added to an ionic liquid or an apolar solvent corresponding to a separation solvent having a low miscibility with the polymer and a high density, such that polymer coated nanoparticles phase-separated by a density difference to thereby be precipitated may be selectively separated. The present invention relates to a method for preparing polymer-nanoparticles having a core-shell structure capable of forming a uniform polymer coating layer with a nanometer scale thickness on surfaces of nanoparticles and being uniformly dispersed in a polymer matrix.

First, the suspension containing the polymer solution and the nanoparticles may be effectively prepared by dispersing the nanoparticles in the polymer solution. Here, in order to effectively disperse the nanoparticles in the polymer solution, a solvent may be further contained.

The polymer solution is a solution obtained by dissolving a polymer in a solvent in order to form a coating layer on the nanoparticles. Here, as the polymer, a general polymer may be used without a particular limitation, and as the solvent, a general organic solvent may also be used. For example, the polymer may be preferably one or two selected from polyamic acid, polyetherimide (PEI), polysulfone, an ion conductive copolymer, polyacrylate, polyester, polyvinylidene fluoride, or poly(vinylidene fluoride/hexafluoropropylene). More preferably, it is effective that the polymer is one or two selected from polyamic acid, polyetherimide (PEI), polysulfone, or the ion conductive copolymer.

Among the polymers, the ion conductive copolymer may be represented by the following [Chemical Formula 1].

[Chemical Formula 1]

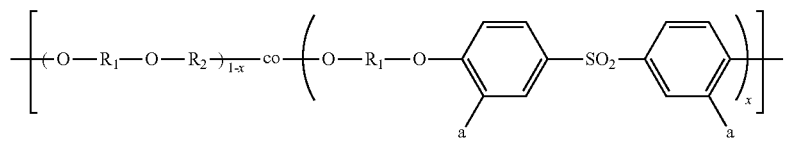

(In Chemical Formula 1, $R_1$ and $R_2$ are each independently one of

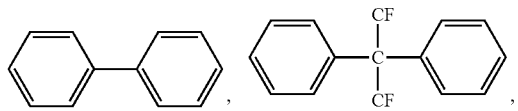

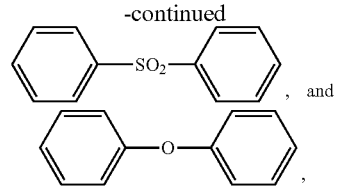

, and and a is an ion conductive group and is one of —$SO_3H$, —COOH, and —$PO_3H$.)

Among the polymers, polyamic acid may be prepared to include an acid dianhydride monomer and a diamine monomer. The acid dianhydride monomer and the diamine monomer are generally used to prepare polyimide and are not particularly limited. In detail, as the acid dianhydride monomer, any one or two or more compounds selected from pyromellitic acid dianhydride, 1,2,3,4-benzene tetracarboxylic acid dianhydride, benzophenone tetracarboxylic acid dianhydride, bis(dicarboxyphenylether) dianhydride, bis(dicarboxyphenylsulfone) dianhydride, bis(dicarboxyphenylsulfide) dianhydride, bis(dicarboxyphenyl)propane dianhydride, bis(dicarboxyphenyl)hexafluoropropane dianhydride, biphenyl tetracarboxylic acid dianhydride, naphthalene tetracarboxylic acid dianhydride, a fluorine-substituted derivative thereof, and an alkyl-substituted derivative thereof may be preferably used. More preferably, it is most effective that the acid dianhydride monomer is pyromellitic acid dianhydride.

In addition, as the diamine monomer, any one or two or more compounds selected from para-phenylenediamine, meta-phenylenediamine, 4,4-oxydianiline, 4,4-methylenedianiline, 2,2-bis(4-aminophenyl)hexafluoropropane, meta-bisaminophenoxydiphenylsulfone, parabisaminophenoxydiphenylsulfone, 1,4-bisaminophenoxybenzene, 1,3-bisaminophenoxybenzene, 2,2-bisaminophenoxyphenylpropane, 2,2-bisaminophenoxyphenylhexafluoropropane, and the like, may be preferably used. More preferably, it is most effective that the diamine monomer is 4,4-oxydianiline.

Further, the solvent is added in order to maintain an optimal concentration of the polymer solution to form the polymer coating layer with a uniform thickness on the surfaces of the nanoparticles. Any solvent may be used without a particular limitation as long as it may dissolve the polymer and have a good miscibility with the ionic liquid or the apolar solvent. More specifically, N,N-dimethylformamide, N,N-dimethylacetamide, N-methyl-2-pyrrolidone, cresol, pyridine, dimethylsulfoxide, γ-butyrolactone, or the like, and a mixed solvent thereof may be used, and the solvent may be used for diluting the suspension.

Preferably, the suspension may contain 15 to 75 vol % of the polymer solution and 25 to 85 vol % of the nanoparticles, or contains 5 to 50 wt % of the polymer solution and 50 to 95 wt % of the nanoparticles. In the case in which a content of the nanoparticles is less than 25 vol % or 50 wt %, an excess of the polymer is firstly precipitated on a solvent interface for a density separation method, such that there is problem in separation of the coated particles by a density difference, and in the case in which a content of the nanoparticles is more than 85 vol % or 95 wt %, since the polymer solution is not sufficient for coating the nanoparticles, nanoparticles on which the polymer coating layer is not formed may be produced.

The particles may be used to form the polymer-nanoparticles, and as the particles, inorganic or metal particles having a size of several nanometers to several hundred micrometers may be used. In more detail, preferably, the particles are inorganic or metal particles having an average particle size of 1 to 100 nm. Preferably, the inorganic particles may be any one or two or more selected from $BaTiO_3$, $TiO_2$, $SiO_2$, $Al_2O_3$, $V_2O_3$, $ZnO_2$, $La_2O_3$, $HfO_2$, $SrTiO_3$, $BaSrTiO_3$, and $Nb_2O_5$ particles, and more preferably, it is effective that the inorganic particles are barium titanate ($BaTiO_3$) or barium strontium titanate ($BaSrTiO_3$) particles.

In addition, preferably, the metal particles may be single metal particles or metal oxide particles containing a metal selected from copper (Cu), silver (Ag), nickel (Ni), gold (Au), platinum (Pt), ruthenium (Ru), iron (Fe), cobalt (Co), indium (In), tin (Sn), tungsten (W), or zinc (Zn), and more preferably, it is effective that the metal particles are nickel oxide particles or nickel particles.

Preferably, the suspension may be diluted by adding the solvent in which the polymer coated nanoparticles are dispersed so that the content of the nanoparticles becomes 1 to 10 wt % of the mixed solution, and more preferably, it is effective that the suspension is diluted so that the content of the nanoparticles becomes 1 to 5 wt % of the mixed solution. The reason is to maintain the optimal concentration in order to effectively separate only the polymer to easily remove the polymer at the time of adding the suspension to the ionic liquid or the apolar solvent used in the density separation method to separate the polymer.

In the case in which the content of the nanoparticles in the suspension is more than 10 wt %, it may be difficult to separate the polymer coated nanoparticles and the polymer from each other in the ionic liquid or the apolar solvent due to an increase in viscosity of the polymer solution.

Preferably, the diluted suspension may be slowly injected to the solvent used in the density separation method to separate the polymer coated nanoparticles and the polymer from each other. As a solvent used for separation, any solvent may be used as long as it has a low compatibility with the polymer and a high density, but preferably, the solvent may be the ionic liquid or the apolar solvent. More preferably, the solvent may be an amphiphilic ionic liquid or an apolar solvent having a density of 1.05 to 1.80 $g/cm^3$. Particularly, it is effective that the solvent is the amphiphilic ionic liquid or chloroform.

When the diluted suspension is slowly injected into a surface of the ionic liquid or the apolar solvent, phase-separation occurs, such that the polymer coating layer coated nanoparticles become precipitated downwardly, and the uncoated polymer forms a layer on the surface of the ionic liquid. Therefore, the remaining polymer may be easily separated. The phase separation may include phase separation and layer separation by the density difference or phase separation and layer separation gradient. It is preferable that a separation time is generally 6 to 24 hours. In the case in which the separation time is less than 6 hours, the unreacted polymer and the polymer coating layer coated nanoparticles may not be sufficiently separated from each other.

The ionic liquid is a material present in a liquid state at room temperature in spite of being composed of bonding of ions. Since the ionic liquid is composed of ions, the ionic liquid has excellent thermal and electrochemical performance and stability and does not contain a molecular solvent, such that the ionic liquid does not have volatility.

In this case, it is preferable that the used ionic liquid is a compound containing a cation represented by the following Chemical Formula 2 or one or two or more anions selected from $PF_6^-$, $BF_4^-$, $SbF_6^-$, $CF_3SO_3^-$, $CH_3SO_4^-$, and $C_2H_5SO_4^-$.

[Chemical Formula 2]

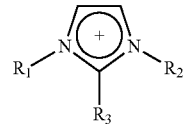

($R_1$ to $R_3$ are each independently present, and are hydrogen or (C1-C10)alkyl.)

Particularly, it is effective that the ionic liquid is 1-butyl-3-methylimidazolium tetrafluoroborate or 1-butyl-2,3-methylimidazolinium tetrafluoroborate.

Preferably, the unreacted polymer coating layer formed on the surface of the ionic liquid may be removed, and the polymer coated nanoparticles may be centrifuged, washed, dried, and then used to prepare a composite with the polymer matrix.

In the case in which the polymer coating layer formed on the nanoparticles is not made of polyamic acid, since the polymer has low compatibility with the ionic liquid, the polymer is cured simultaneously with being coated on the surfaces of the particles, such that a separate curing process is not required.

Further, in the case in which the polymer coating layer is made of polyamic acid, it is preferable that chemical imidization is simultaneously performed by injecting an imidization catalyst. As the imidization catalyst, any catalyst known in the art may be used without limitations. In detail, acid anhydrides such as acetic acid anhydride, isoquinoline, β-picoline, pyridine, azole, phosphine, malononitrile, 2,6-dimethylpiperidine, triethylamine, N,N,N,N'-tetramethyl-ethylenediamine, triphenylphosphine, 4-dimethylaminopyridine, tripropylamine, tributylamine, N,N-dimethylbenzylamine, 1,2,4-triazole, triisobutylamine, and the like, may be used.

It is preferable that the imidization catalyst is added at a molar ratio of 1:1 with respect to polyamic acid. The imidization catalyst is added to the ionic liquid or the apolar solvent from which the unreacted polyamic acid layer was removed, and reacted while being stirred using a magnetic bar at 30 to 100☐ for 3 to 7 hours, thereby performing imidization of the polyamic acid coating layer enclosing the inorganic particles into polyimide. The polymer-nanoparticles formed by coating polyimide on the particles are centrifuged, washed, dried, and then used to prepare the composite with the polymer matrix.

The polymer-nanoparticles having a core-shell structure prepared by the method as described above may be added to the polymer matrix to thereby be obtained in a composite form. The polymer matrix used in this case may be a polymer generally used to form a polymer-nanoparticle composite, for example, polyamic acid, polystyrene, polycarbonate, polyimide, polyacrylate, polyester, polyethersulfone, polyvinylidene fluoride, poly(vinylidenefluoridehexafluoropropylene), or the like, or a solution obtained by dissolving the polymer in an organic solvent.

Preferably, a content of the polymer-nanoparticles having a core-shell structure may be 5 to 90 parts by weight based on 100 parts by weight of the polymer matrix. In the case in which the content of the polymer-nanoparticles having a core-shell structure is less than 5 parts by weight, the content of the particles contained in the composite is excessively small, such that an effect of improving dielectric properties and insulation properties may be insignificant, and in the case in which the content of the polymer-nanoparticles having a core-shell structure is more than 90 parts by weight, it is difficult to form a uniform composite.

The polymer-nanoparticles having a core-shell structure and the polymer used as the matrix are mixed, stirred and then cast on a substrate, thereby being prepared in a film form by a general polymer film casting method. The polymer-nanoparticle composite may be prepared in the film form by various methods known in the art such as a bar coating method, a roll coating method, a knife coating method, a gravure coating method, a spin coating method, a slot die-coating method, or the like, but the present invention is not limited thereto. In more detail, in the case in which the polymer is polyamic acid, the polymer solution containing the polymer-nanoparticles is applied on a glass substrate and cured at 80 to 250□ for 2 to 4 hours and at 350 to 400□ for 10 to 60 minutes under nitrogen atmosphere, thereby making it possible to obtain the polymer-nanoparticle composite.

The polymer-nanoparticle composite having a core-shell structure prepared by the above-mentioned method according to the present invention may be applied to a catalyst for fuel cell, various electronic components, that is, a capacitor, an electrical storage device, a gate insulation film, a memory device, and the like.

Advantageous Effects

With a method for preparing polymer-nanoparticles having a core-shell structure and polymer-nanoparticles prepared thereby, when forming a polymer coating layer on surfaces of nanoparticles that are not subjected to separate surface treatment, there are advantages in that an ionic liquid or an apolar solvent having a low compatibility with a polymer and a high density is used to thereby easily separate and remove polymers uncoated on nanoparticles by a density separation method, and a polymer coating layer coated on surfaces of the nanoparticles may be uniformly and densely formed with a nanometer scale uniform thickness.

In addition, the polymer-nanoparticles having a core-shell structure prepared by the method as described above has an advantage in that dispersibility in a polymer matrix is excellent.

BEST MODE

Figure 1:
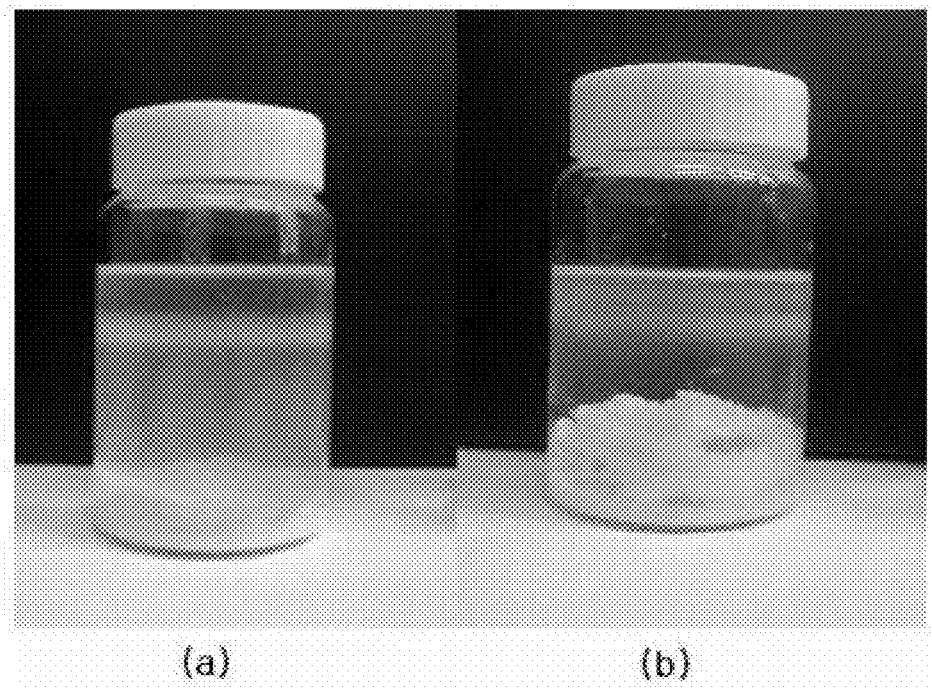
FIG. 1A is a digital photograph of a separated upper polymer coating layer and precipitated polymer-nanoparticles having a core-shell structure in an ionic liquid in Example 1 according to the present invention.
FIG. 1B is a digital photograph of a separated upper polyamic acid layer and precipitated polymer-nanoparticles having a core-shell structure in chloroform in Example 10 according to the present invention.

Hereinafter, preferable embodiments of polymer-nanoparticles having a core-shell structure prepared by a method for preparing polymer-nanoparticles having a core-shell structure according to the present invention, and a method for measuring physical properties thereof will be described in detail. Hereinafter, the present invention will be understood and appreciated more fully from the following embodiments, and the embodiments are for illustrating the present invention and not for limiting the present invention defined by the accompanying claims.

The method for measuring physical properties of polymer-nanoparticle composites having a core-shell structure in Examples and Comparative Examples of the present invention will be described in detail, and the measurement results are shown in the following Table 1.

Measurement of Physical Properties

1) Observation of Morphology of Polymer-Nanoparticles

Morphology of polymer-nanoparticles having a core-shell structure prepared in Examples and Comparative Examples of the present invention was observed using a transmission electron microscope (TEM) after putting and drying a particle-dispersed solution in a carbon coated copper grid using a Tecani G2 20 electron microscope (manufactured by FEI).

2) Measurement of FT-IR of Polymer-Nanoparticles

The polymer-nanoparticles having a core-shell structure prepared in Examples and Comparative Examples of the present invention were analyzed using ChemID FT-IR (manufactured by Smith Detection).

Further, provided that in the polymer-nanoparticles prepared by the method for preparing polymer-nanoparticles according to the present invention, the polymer is polyamic acid, a gold electrode is deposited on a polymer-nanoparticle composite thin film to manufacture a parallel plate type capacitor, and dielectric properties and insulation properties were measured.

3) Measurement of Dielectric Properties

A dielectric constant value (relative dielectric constant, electric capacity density) at 40 Hz to 1 MHz was measured using Agilent 4294A Precision Impedance Analyzer.

4) Measurement of Leakage Current Density

Measurement was performed at a voltage of 100 Vdc on the same thin film capacitor (area: 3.14 mm2) using Agilent E5272A and 2 channel source.

5) Measurement of Insulation Properties

Measurement was performed using Keithley 2410 source meter.

Example 1

Preparation of Polymer-Nanoparticles Having Core-Shell Structure

After a mechanical stirring apparatus was installed in a three-neck flask and water and ice were filled in a sonicator, 86.86 g of barium titanate (100 nm, Sigma Aldrich) that was not subjected to surface treatment and 2.39 g of 4,4-oxydianiline (11.95 mmol) were mixed with 35 g of dimethylformamide (DMF) under nitrogen atmosphere, stirred for 1 hour, and dispersed using the sonicator. A temperature of a reactor was cooled to 0° C. using ice. 2.60 g of pyromellitic acid dianhydride (11.95 mmol) was dropped together with 10 g of DMF in four lots and reacted at room temperature (20° C.) for 6 hours.

The solution was diluted so that a content of barium titanate nanoparticles dispersed in the prepared polyamic acid solution became 2 wt % of the polyamic acid solution and then stirred for 30 minutes. The diluted solution was dropped in 200 g of 1-butyl-3-methylimidazolinium tetrafluoroborate ionic liquid at a rate of 5 ml/min and stored at room temperature for 24 hours, such that unreacted polyamic acid and polyamic acid coated barium titanate were separated from each other by phase separation using a density difference.

Figure 2:
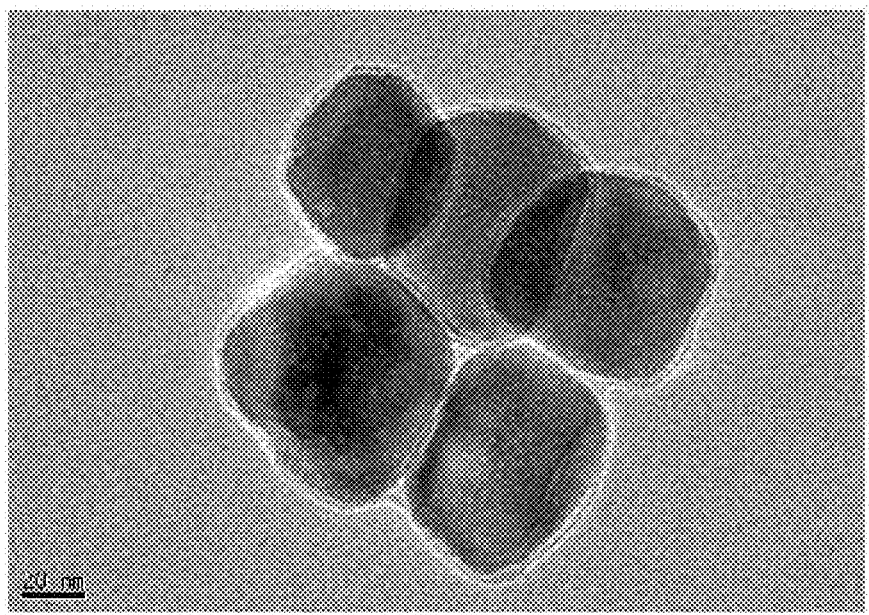
FIG. 2 is a transmission electron microscope (TEM) image photograph of the polymer-nanoparticles having a core-shell structure in Example 1 according to the present invention.
Figure 3:
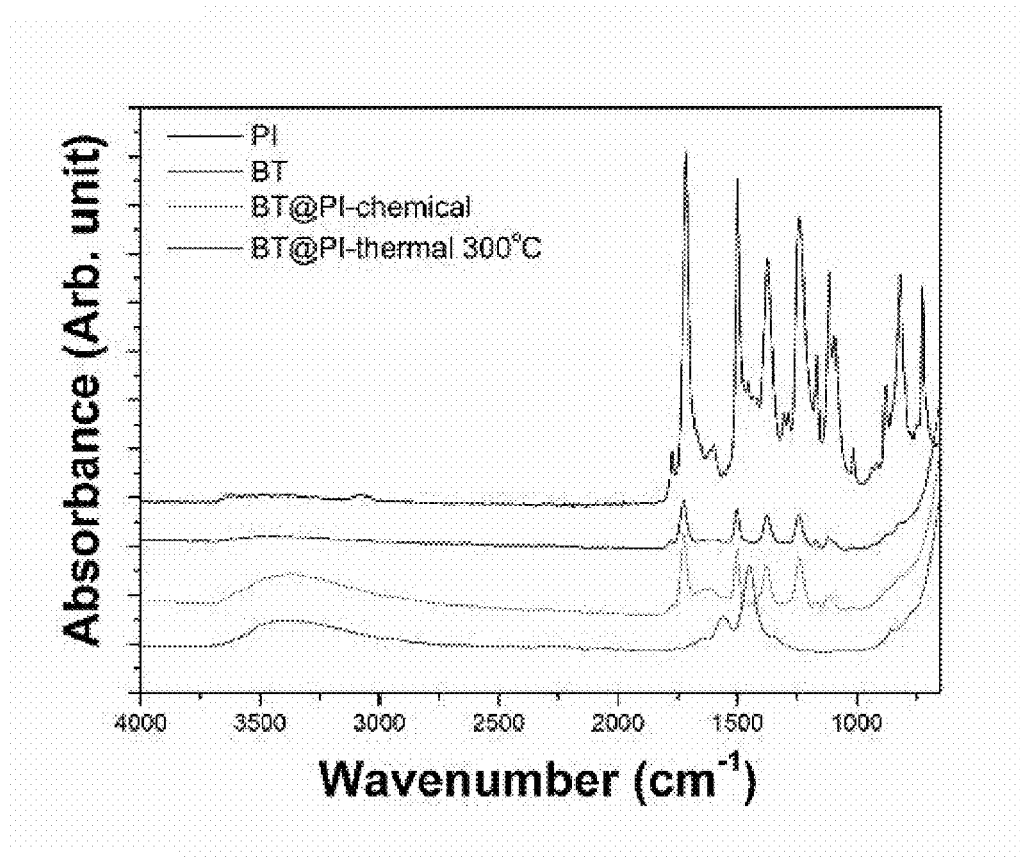
FIG. 3 is a graph showing results of Fourier transform-infrared (FT-IR) analysis of the polymer-nanoparticles having a core-shell structure in Example 1 according to the present invention.

After removing an excess of polyamic acid separated at an upper portion of the ionic liquid, 20 ml of pyridine and 20 ml of acetic acid anhydride were dropped at a rate of 20 ml/min and reacted while being stirred at 25☐ for 5 hours, thereby preparing polymer-nanoparticles having a core-shell structure. The prepared particles were separated using a centrifuge, washed with DI water three times, and then dried in an oven at 60° C. for 24 hours. The dried polymer-nanoparticles are heat treated in an oven at 300° C. for 1 hour in order to be completely imidized. A TEM image photograph of the polymer-nanoparticles having a core-shell structure prepared by the above-mentioned method is shown in FIG. 2.

Example 2

Polymer-nanoparticles having a core-shell structure were prepared by the same method as in Example 1 except for using 1-butyl-2,3-methylimidazolinium tetrafluoroborate ionic liquid instead of the 1-butyl-3-methylimidazolinium tetrafluoroborate ionic liquid.

Example 3

Figure 4:
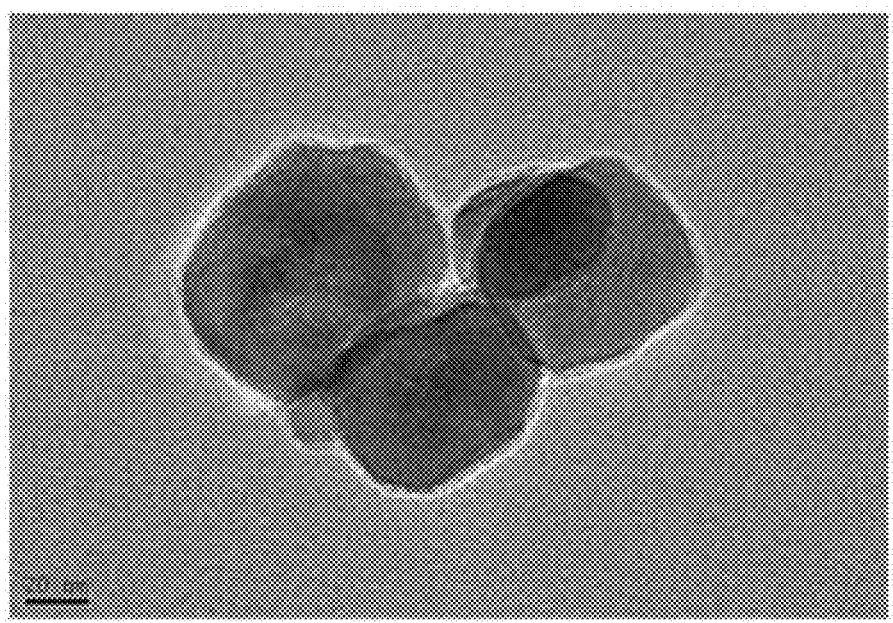
FIG. 4 is a transmission electron microscope (TEM) image photograph of polymer-nanoparticles having a core-shell structure in Example 3 according to the present invention.
Figure 5:
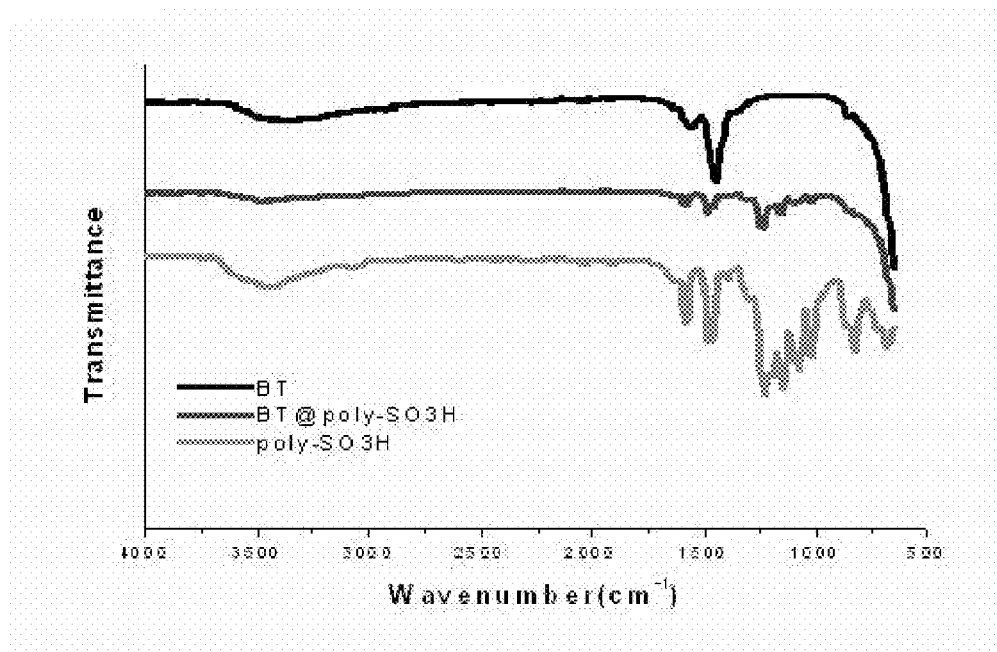
FIG. 5 is a graph showing results of Fourier transform-infrared (FT-IR) analysis of the polymer-nanoparticles having a core-shell structure in Example 3 according to the present invention.

Polymer-nanoparticles having a core-shell structure were prepared by the same method as in Example 1 except that 85.86 g of barium titanate (100 nm or less, Sigma Aldrich) that was not subjected to surface treatment and 5 g of disulfonated(arylene ether) copolymer were mixed with 45 g of DMF, stirred the mixture for 1 hour, and dispersed using a sonicator. A TEM image photograph of the polymer-nanoparticles having a core-shell structure prepared by the above-mentioned method is shown in FIG. 4.

Example 4

Figure 6:
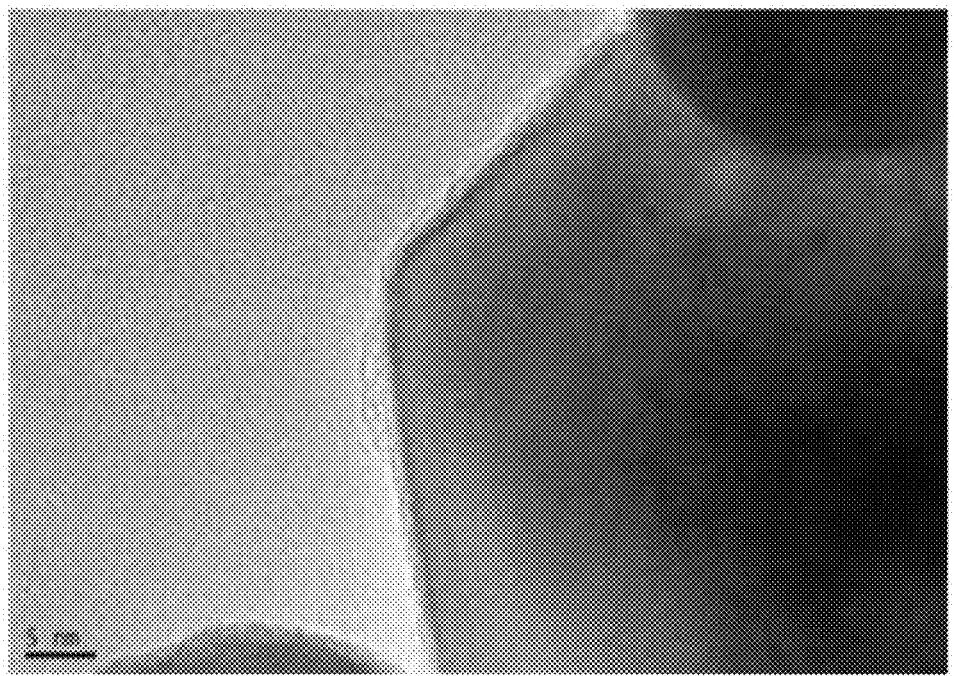
FIG. 6 is a transmission electron microscope (TEM) image photograph of polymer-nanoparticles having a core-shell structure in Example 4 according to the present invention.
Figure 7:
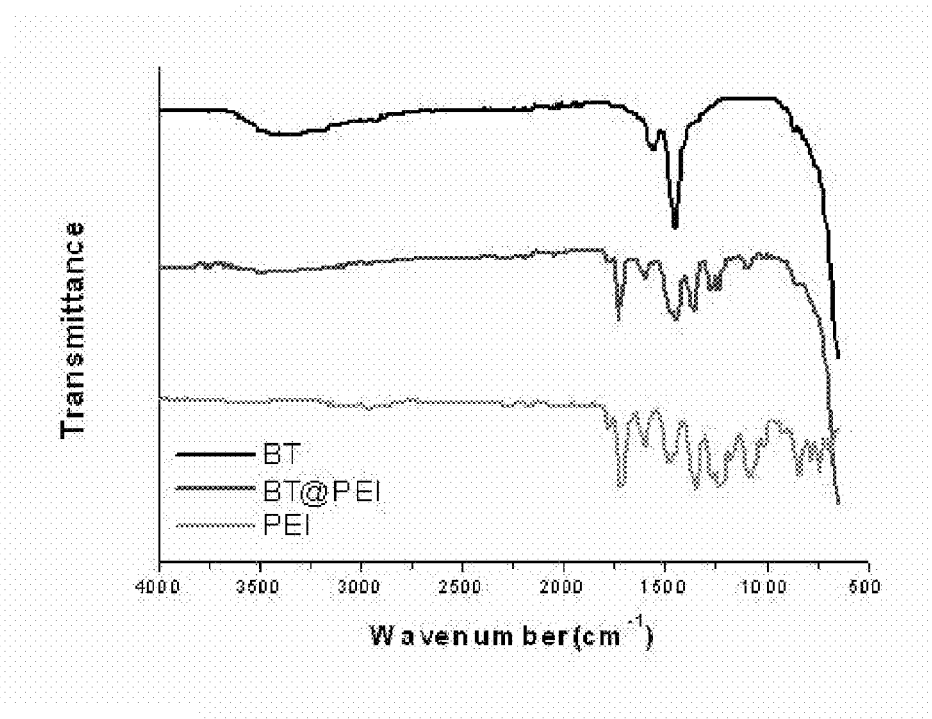
FIG. 7 is a graph showing results of Fourier transform-infrared (FT-IR) analysis of the polymer-nanoparticles having a core-shell structure in Example 4 according to the present invention.

Polymer-nanoparticles having a core-shell structure were prepared by the same method as in Example 1 except that 95.74 g of barium titanate (100 nm or less, Sigma Aldrich) that was not subjected to surface treatment and 5 g of polyetherimide were mixed with 45 g of DMF, stirred the mixture for 1 hour, and dispersed using a sonicator. A TEM image photograph of the polymer-nanoparticles having a core-shell structure prepared by the above-mentioned method is shown in FIG. 6.

Example 5

Figure 8:
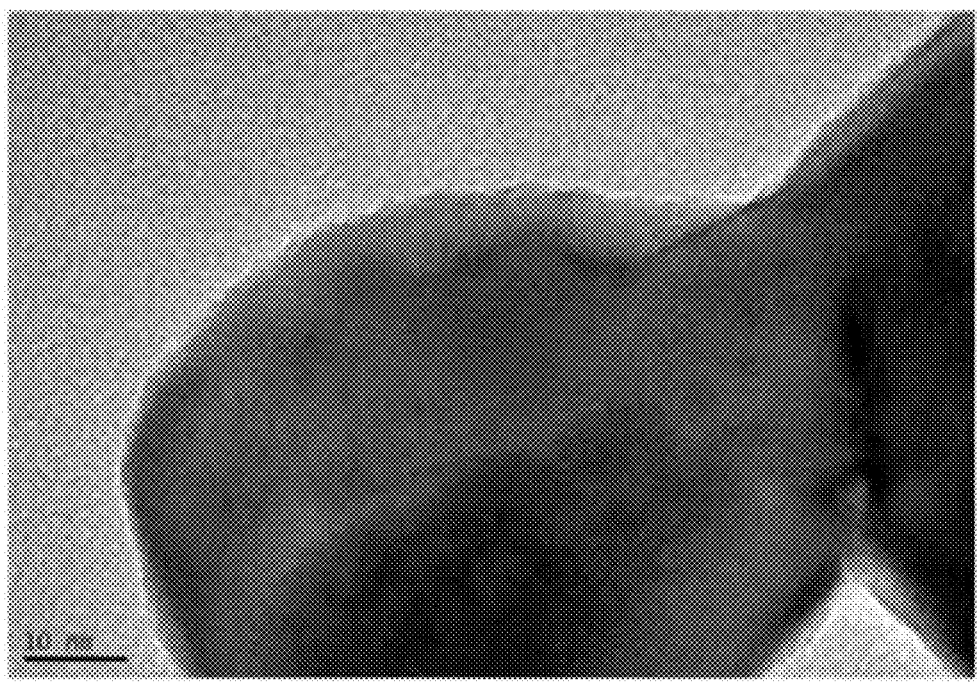
FIG. 8 is a transmission electron microscope (TEM) image photograph of polymer-nanoparticles having a core-shell structure in Example 5 according to the present invention.
Figure 9:
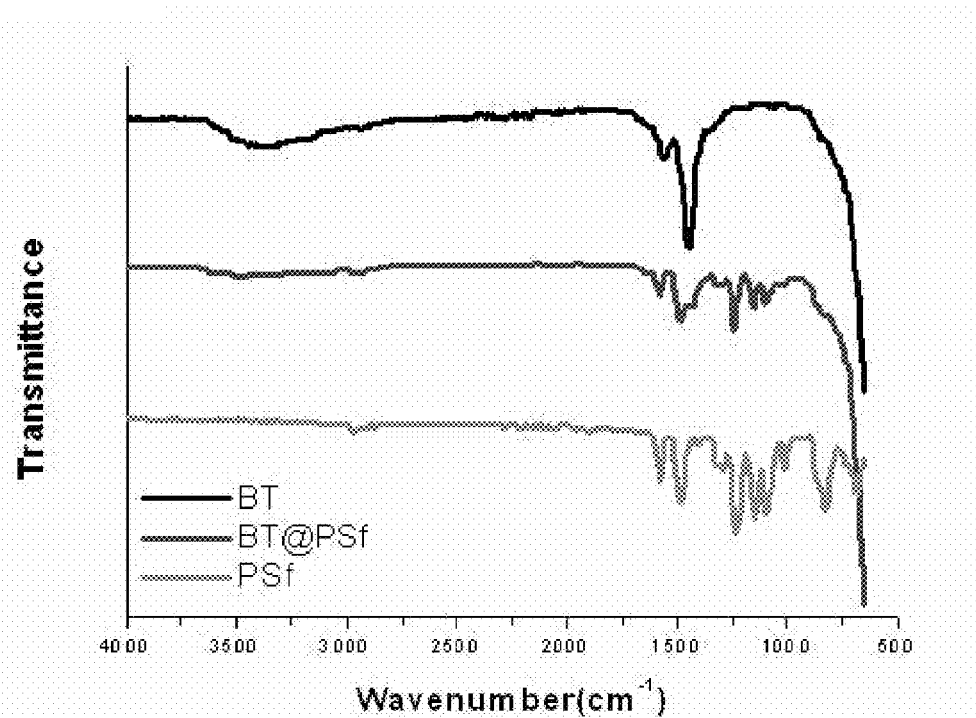
FIG. 9 is a graph showing results of Fourier transform-infrared (FT-IR) analysis of the polymer-nanoparticles having a core-shell structure in Example 5 according to the present invention.

Polymer-nanoparticles having a core-shell structure were prepared by the same method as in Example 1 except that 98.06 g of barium titanate (100 nm or less, Sigma Aldrich) that was not subjected to surface treatment and 5 g of polysulfone were mixed with 45 g of DMF, stirred the mixture for 1 hour, and dispersed using a sonicator. A TEM image photograph of the polymer-nanoparticles having a core-shell structure prepared by the above-mentioned method is shown in FIG. 8.

Example 6

Figure 10:
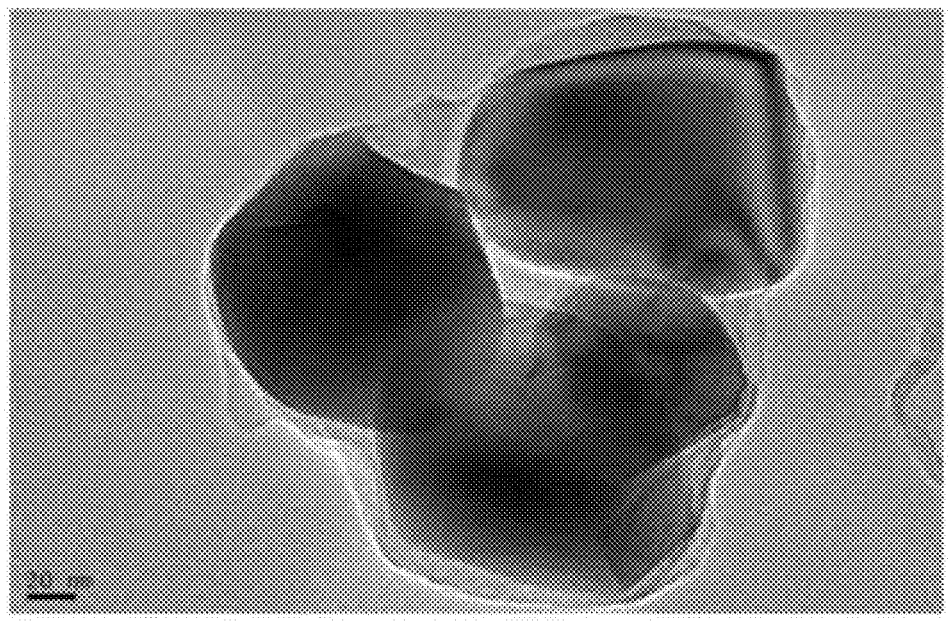
FIG. 10 is a transmission electron microscope (TEM) image photograph of polymer-nanoparticles having a core-shell structure in Example 6 according to the present invention.

Polymer-nanoparticles having a core-shell structure were prepared by the same method as in Example 1 except for using 95.29 g of nickel oxide (100 nm, Sigma Aldrich) that was not subjected to surface treatment in preparing polyimide-nanoparticles, and a TEM image photograph of the prepared particles is shown in FIG. 10.

Example 7

Figure 11:
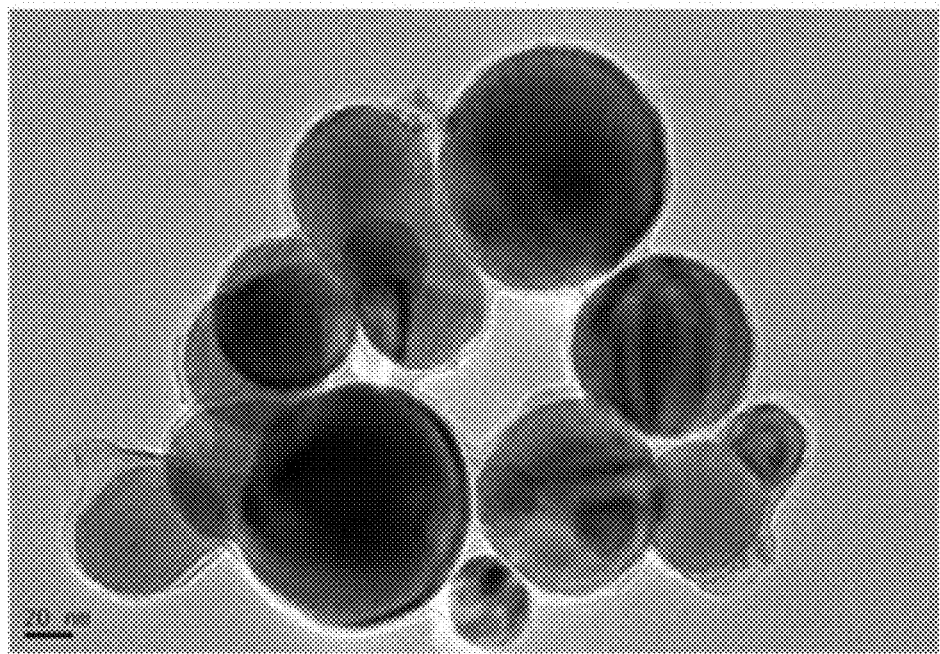
FIG. 11 is a transmission electron microscope (TEM) image photograph of polymer-nanoparticles having a core-shell structure in Example 7 according to the present invention.

Polymer-nanoparticles having a core-shell structure were prepared by the same method as in Example 1 except for using 95.29 g of nickel (100 nm, Sigma Aldrich) that was not subjected to surface treatment in preparing polyimide-nanoparticles, and a TEM image photograph of the prepared particles is shown in FIG. 11.

Comparative Example 1

4 g of barium titanate that was not subjected to surface treatment and 10 g of polyamic acid prepared using pyromellitic acid dianhydride-oxydianiline were dispersed in 100 ml of a DMAc solution and reacted at room temperature (20° C.) for 6 hours, thereby preparing polymer-nanoparticles. The prepared particles were separated using a centrifuge, washed with DI water three times, and then dried in an oven at 60° C. for 24 hours. The dried polymer-nanoparticles are heat treated in an oven at 300° C. for 1 hour in order to be completely imidized.

As shown in FIGS. 1A and 1B, it may be confirmed that as the ionic liquid or the apolar solvent having a low compatibility with the polymer coated on the nanoparticles and a high density was used, the polymer coated nanoparticles and remaining polymer were separated by a density difference, such that the remaining polymer uncoated on the nanoparticles formed a layer at an upper end of the ionic liquid or the apolar solvent, and the coated nanoparticles were precipitated at a lower end thereof.

In addition, FIGS. 2 to 12 show the TEM image photographs and FT-IR graphs of the polymer-nanoparticles.

As shown in the FT-IR analysis of the polymer-nanoparticles of FIGS. 3, 5, 7, and 9, it may be confirmed that the polymer coating layer coated on the polymer-nanoparticles was stably maintained.

It may be confirmed that in the case of completely removing the remaining polymer uncoated on the nanoparticles using the ionic liquid or the apolar solvent to form the polymer-nanoparticles, a polymer coating layer was uniformly formed with a nanometer scale thickness, and it may be appreciated that this method may be applied to various polymers and nanoparticles without particularly surface treating the nanoparticles.

In addition, it may be appreciated that in Comparative Example 1 in which the polymer-nanoparticles were prepared without removing remaining polymer uncoated on the nanoparticles using the ionic liquid or the apolar solvent, the nanoparticles were coagulated with each other, such that it was impossible to form a uniform polymer coating layer at a nanometer level.

Example 8

Preparation of Polymer-Nanoparticle Composite Having Core-Shell Structure 12 g of the polymer-nanoparticles prepared in Example 1 and 12 g of polyamic acid prepared using pyromellitic acid dianhydride-oxydianiline were dispersed in 100 ml of a DMAc solution, spin-cast on a glass substrate on which an indium tin oxide (ITO) electrode was patterned, and then heat treated in an oven at 60, 120, 250, and 350° C. under nitrogen atmosphere for 30 minutes at each temperature, thereby preparing a polymer-nanoparticle composite thin film.

Example 9

A polymer-nanoparticle composite thin film was prepared by the same method in Example 8 except that a content of the used polymer-nanoparticles was increased to 36 g.

Example 10

A polymer-nanoparticle composite thin film was prepared by the same method in Example 8 using polymer-nanoparticles prepared by the same method in Example 1 except for using chloroform instead of the ionic liquid to separate the polymer and the nanoparticles.

Example 11

A polymer-nanoparticle composite thin film was prepared by the same method in Example 10 except that a content of the used polymer-nanoparticles was increased to 36 g.

Comparative Example 2

12 g of barium titanate and 12 g of polyamic acid prepared using pyromellitic acid dianhydride-oxydianiline were dispersed in 100 ml of a DMAc solution, spin-cast on a glass substrate on which an indium tin oxide (ITO) electrode was patterned, and then heat treated in an oven at 60, 120, 250, and 350° C. under nitrogen atmosphere for 30 minutes at each temperature, thereby preparing a polymer-nanoparticle composite thin film.

TABLE 1

| Classification | Separation Solution | Content of Nanoparticles (wt %) | | Dielectric Constant | Leakage Current Density (nA/cm$^2$) | Breakdown Voltage (MV/m) |
| --- | --- | --- | --- | --- | --- | --- |
| Example 8 | Ionic Liquid | BT/PI Composite | 50 | 15.1 | 7.3 | 210 |
| Example 9 | Ionic Liquid | BT/PI Composite | 75 | 34.5 | 24 | 165 |
| Example 10 | Chloroform | BT/PI Composite | 50 | 13.4 | 10.6 | 201 |
| Example 11 | Chloroform | BT/PI Composite | 75 | 28.9 | 35.7 | 154 |
| Comparative Example 2 | — | BT | 50 | 10.2 | 176 | 112 |

Example 12

Figure 12:
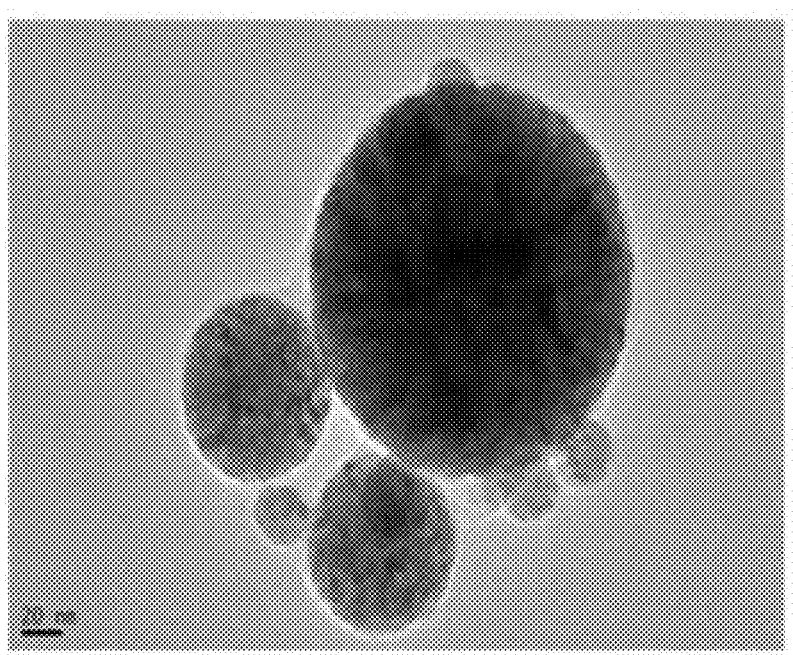
FIG. 12 is a transmission electron microscope (TEM) image photograph of polymer-nanoparticles having a core-shell structure in Example 12 according to the present invention.

Polymer-nanoparticles having a core-shell structure were prepared by the same method as in Example 1 except for using 70.14 g of barium strontium titanate (100 nm or less, Sigma Aldrich) that was not subjected to surface treatment instead of barium titanate that was not subjected to surface treatment, and a TEM image photograph of the prepared particles is shown in FIG. 12. In addition, a polymer-nanoparticle composite thin film was prepared by the same method in Example 8 using 12 g of the polymer-nanoparticles prepared by the method as described above.

Example 13

A polymer-nanoparticle composite thin film was prepared by the same method in Example 12 except that a content of the used polymer-nanoparticles was increased to 36 g.

Comparative Example 3

12 g of barium strontium titanate and 12 g of polyamic acid prepared using pyromellitic acid dianhydride-oxydianiline were dispersed in 100 ml of a DMAc solution, spin-cast on a glass substrate on which an indium tin oxide (ITO) electrode was patterned, and then heat treated in an oven at 60, 120, 250, and 350° C. under nitrogen atmosphere for 30 minutes at each temperature, thereby preparing a polymer-nanoparticle composite thin film.

TABLE 2

| Classification | Separation Solution | Content of Nanoparticles (wt %) | | Dielectric Constant | Leakage Current Density (nA/cm$^2$) | Breakdown Voltage (MV/m) |
| --- | --- | --- | --- | --- | --- | --- |
| Example12 | Ionic Liquid | BST/PI Composite | 50 | 9.2 | 0.49 | 256 |
| Example13 | Ionic Liquid | BST/PI Composite | 75 | 20.6 | 9.1 | 217 |
| Comparative Example 3 | — | BST | 50 | 7.6 | 92 | 124 |

As shown in Tables 1 and 2, in the case of the polymer-nanoparticle-composite obtained by completely removing the remaining polymer uncoated on the surfaces of the nanoparticles by the density separation method using the ionic liquid or the apolar solvent and containing nanoparticles of which the polymer coating layer was formed on the surfaces with a several nanometer thickness, the physical properties such as the dielectric properties, the leakage current density, the breakdown voltage, and the like, were improved as compared to the composite containing nanoparticles on which the polymer coating layer was not formed as in Comparative Examples 2 and 3.

In addition, as shown in the results of Examples 11 and 13, it may be appreciated that in the composites in which the content of the polymer-nanoparticles was increased, breakdown voltage and dielectric constant were further increased, such that the polymer coating layer formed a stable interface with the nanoparticles.

This property is a result of formation of a stable polymer coating layer on surfaces of the nanoparticles and stabilization of the interface between the polymer coating layer and the nanoparticles due to strong electrostatic bonding as shown in the TEM image photographs (FIGS. 2 and 12) of the polymer-nanoparticles having a core-shell structure according to the present invention. It is considered that dielectric constant and the insulation property were increased by blocking the nanoparticles from directly contacting each other due to an increase in dispersibility in the polymer matrix and the polymer coating layer.

Therefore, in the polymer-nanoparticles having a core-shell structure prepared by the method for preparing polymer-nanoparticles according to the present invention, the remaining polymer may be easily removed by the density separation method regardless of the kinds of nanoparticles and polymer, and the uniform polymer coating layer may be formed on the surfaces of the nanoparticles. In addition, the polymer-nanoparticles may be uniformly dispersed in the polymer matrix.

Further, it may be confirmed that in the case of preparing the composite in which the polymer-nanoparticles were uniformly dispersed, the dielectric properties and insulation properties of the nanoparticles were significantly improved.

Exemplary embodiments of the present invention were described above, but the present invention may include various changes, modifications, and equivalents. It will be appreciated that the present invention may be similarly applied by modifying the exemplary embodiments. Therefore, the above-mentioned contents are not for limiting the present invention defined by the accompanying claims.

The invention claimed is:

1. A method for preparing polymer-nanoparticles having a core-shell structure, the method comprising preparing a suspension containing a polymer solution and nanoparticles;

adding the suspension to an ionic liquid or an apolar solvent having a density of 1.05 to 1.80 g/cm$^3$, thereby separating polymer-coated nanoparticles and remaining polymer solution from each other by phase separation due to a density difference; and removing the remaining polymer solution separated at an upper portion of the ionic liquid or the apolar solvent, wherein the polymer solution is one or two selected from polyamic acid, polyetherimide, polysulfone, or an ion conductive copolymer, wherein the ionic liquid is a compound containing a cation represented by the following Chemical Formula 2 or one or two or more anions selected from $PF_6^-$, $BF_4^-$, $SbF_6^-$, $CF_3SO_3^-$, $CH_3SO_4^-$, and $C_2H_5SO_4^-$,

[Chemical Formula 2]

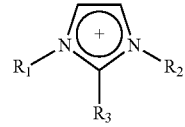

($R_1$ to $R_3$ are each independently present and are hydrogen or (C1-C10) alkyl).

2. The method of claim 1, wherein the suspension contains 15 to 75 vol % of the polymer solution and 25 to 85 vol % of the nanoparticles or contains 5 to 50 wt % of the polymer solution and 50 to 95 wt % of the nanoparticles.

3. The method of claim 1, wherein the nanoparticles are inorganic or metal particles, the inorganic particles being any one or two or more selected from $BaTiO_3$, $BaSrTiO_3$, $TiO_2$, $SiO_2$, $Al_2O_3$, $V_2O_3$, $ZnO_2$, $La_2O_3$, $HfO_2$, $SrTiO_3$, and $Nb_2O_5$ particles, and the metal particles being single metal particles or metal oxide particles containing a metal selected from copper (Cu), silver (Ag), nickel (Ni), gold (Au), platinum (Pt), ruthenium (Ru), iron (Fe), cobalt (Co), indium (In), tin (Sn), tungsten (W), or zinc (Zn).

4. The method of claim 2, further comprising adding a solvent to dilute the suspension so that a content of the nanoparticles is 1 to 10 wt % before the step of adding the suspension to the ionic liquid or the apolar solvent.

5. The method of claim 1, wherein the ionic liquid is 1-butyl-3-methylimidazolinium tetrafluoroborate or 1-butyl-2,3-methylimidazolinium tetrafluoroborate.

* * * * *